(12) United States Patent
Jeansonne et al.

(10) Patent No.: US 9,990,255 B2
(45) Date of Patent: Jun. 5, 2018

(54) REPAIRING COMPROMISED SYSTEM DATA IN A NON-VOLATILE MEMORY

(71) Applicant: Hewlett-Packard Development Company, L.P., Houston, TX (US)

(72) Inventors: Jeffrey Kevin Jeansonne, Houston, TX (US); Valiuddin Y Ali, Houston, TX (US); Boris Balacheff, Les Ulis (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

(21) Appl. No.: 14/780,981

(22) PCT Filed: Apr. 23, 2013

(86) PCT No.: PCT/US2013/037729
§ 371 (c)(1),
(2) Date: Sep. 28, 2015

(87) PCT Pub. No.: WO2014/175865
PCT Pub. Date: Oct. 30, 2014

(65) Prior Publication Data
US 2016/0055069 A1     Feb. 25, 2016

(51) Int. Cl.
*G06F 11/00*     (2006.01)
*G06F 11/14*     (2006.01)
(Continued)

(52) U.S. Cl.
CPC ........ *G06F 11/1469* (2013.01); *G06F 3/0619* (2013.01); *G06F 3/0629* (2013.01);
(Continued)

(58) Field of Classification Search
CPC ............. G06F 11/1417; G06F 11/1456; G06F 11/1458; G06F 3/0619; G06F 3/0629; G06F 11/1469
See application file for complete search history.

(56) References Cited

U.S. PATENT DOCUMENTS 5,269,022 A    12/1993  Shinjo
5,327,531 A    7/1994   Bealkowski et al.
(Continued)

FOREIGN PATENT DOCUMENTS

KR    101038567 B1    6/2011
TW    200842567       11/2008
TW    2010/07465 A    2/2010

OTHER PUBLICATIONS

Hodge et al., International Application No. PCT/US13/37725 entitled Redundant System Boot Code in a Secondary Non-Volatile Memory filed Apr. 23, 2013 (25 pages).
(Continued)

*Primary Examiner* — Bryce P Bonzo
*Assistant Examiner* — Jonathan D Gibson
(74) *Attorney, Agent, or Firm* — Trop, Pruner & Hu P.C.

(57) ABSTRACT

A first non-volatile memory stores a redundant copy of system data that relates to a configuration of at least one physical component of a system, where the first non-volatile memory is accessible by a controller in the system and inaccessible to a processor in the system. It is determined whether system data in a second non-volatile memory accessible by the processor is compromised. In response to determining that the system data in the second non-volatile memory is compromised, the compromised system data in the second non-volatile memory is repaired.

17 Claims, 4 Drawing Sheets

(51) Int. Cl.
  *G06F 3/06* (2006.01)
  *G06F 11/16* (2006.01)
(52) U.S. Cl.
  CPC ........ *G06F 3/0683* (2013.01); *G06F 11/1417* (2013.01); *G06F 11/1456* (2013.01); *G06F 11/1458* (2013.01); *G06F 11/1612* (2013.01); *G06F 2201/83* (2013.01); *G06F 2201/84* (2013.01)

(56) References Cited

U.S. PATENT DOCUMENTS

| | | | |
|---|---|---|---|
| 5,432,927 A | 7/1995 | Grote | |
| 5,469,573 A | 11/1995 | McGill, III | |
| 5,564,054 A | 10/1996 | Bramnick | |
| 5,713,024 A | 1/1998 | Halladay | |
| 5,745,669 A | 4/1998 | Hugard | |
| 5,822,581 A | 10/1998 | Christeson | |
| 5,828,888 A | 10/1998 | Kozaki | |
| 5,918,047 A | 6/1999 | Leavitt | |
| 5,987,605 A | 11/1999 | Hill | |
| 6,205,527 B1 | 3/2001 | Goshey | |
| 6,275,930 B1 | 8/2001 | Bonamico | |
| 6,539,473 B1 | 3/2003 | Hubacher | |
| 6,651,188 B2 | 11/2003 | Harding | |
| 6,934,881 B2* | 8/2005 | Gold | G06F 11/1417 714/15 |
| 7,069,445 B2 | 6/2006 | Cheston | |
| 7,100,087 B2* | 8/2006 | Yang | G06F 9/4401 713/1 |
| 7,136,994 B2 | 11/2006 | Zimmer | |
| 7,193,895 B2 | 3/2007 | Jin et al. | |
| 7,340,595 B2* | 3/2008 | Blinick | G06F 11/1417 713/1 |
| 7,383,431 B2 | 6/2008 | Takamizawa | |
| 7,409,539 B2 | 8/2008 | Arnez | |
| 7,613,872 B2* | 11/2009 | Dayan | G06F 21/575 711/103 |
| 7,734,945 B1 | 6/2010 | Levidow | |
| 7,818,622 B2 | 10/2010 | Burks, III | |
| 8,006,125 B1* | 8/2011 | Meng | G06F 11/1417 714/6.2 |
| 8,341,386 B2* | 12/2012 | Lee | G06F 11/1417 713/1 |
| 8,392,762 B2 | 3/2013 | Aralakuppe | |
| 8,429,391 B2 | 4/2013 | Galbo | |
| 8,489,922 B2 | 7/2013 | Matthew | |
| 9,063,836 B2* | 6/2015 | Swanson | G06F 11/1008 |
| 9,411,688 B1 | 8/2016 | Poolla | |
| 9,417,967 B2 | 8/2016 | Huang | |
| 9,542,195 B1 | 1/2017 | Astarabadi | |
| 9,575,768 B1 | 2/2017 | Kim | |
| 9,852,298 B2* | 12/2017 | Jeansonne | G06F 21/575 |
| 2001/0008011 A1 | 7/2001 | Oba | |
| 2002/0002652 A1 | 1/2002 | Takahashi | |
| 2002/0078338 A1 | 6/2002 | Lay | |
| 2003/0126511 A1 | 7/2003 | Yang | |
| 2003/0221114 A1 | 11/2003 | Hino | |
| 2004/0025002 A1 | 2/2004 | Cepulis | |
| 2004/0030877 A1 | 2/2004 | Frid | |
| 2004/0133790 A1 | 7/2004 | Hensley | |
| 2004/0193862 A1 | 9/2004 | Lin | |
| 2004/0268079 A1 | 12/2004 | Riedle et al. | |
| 2005/0081090 A1* | 4/2005 | Lin | G06F 11/1417 714/6.11 |
| 2005/0108564 A1 | 5/2005 | Freeman | |
| 2005/0190699 A1 | 9/2005 | Smith | |
| 2005/0251673 A1 | 11/2005 | Bosley | |
| 2005/0273588 A1 | 12/2005 | Ong | |
| 2006/0020844 A1* | 1/2006 | Gibbons | G06F 11/1417 714/2 |
| 2006/0075395 A1 | 4/2006 | Lee | |
| 2006/0143431 A1* | 6/2006 | Rothman | G06F 11/1417 713/2 |
| 2006/0161784 A1 | 7/2006 | Hunter | |
| 2006/0225067 A1 | 10/2006 | Yang | |
| 2006/0236198 A1* | 10/2006 | Lintz, Jr. | G06F 11/0727 714/758 |
| 2007/0260866 A1 | 11/2007 | Wang | |
| 2008/0040596 A1 | 2/2008 | Mai | |
| 2008/0086631 A1 | 4/2008 | Chow | |
| 2008/0098381 A1 | 4/2008 | Lin | |
| 2008/0126782 A1 | 5/2008 | Dayan | |
| 2008/0141016 A1 | 6/2008 | Chang | |
| 2008/0155331 A1* | 6/2008 | Rothman | G06F 11/1417 714/36 |
| 2008/0172558 A1 | 7/2008 | Stakutis | |
| 2008/0195750 A1 | 8/2008 | Sadovsky | |
| 2008/0209553 A1 | 8/2008 | Lu | |
| 2008/0289954 A1 | 10/2008 | Lev | |
| 2009/0063834 A1 | 3/2009 | Huang | |
| 2009/0089570 A1 | 4/2009 | Andrianov | |
| 2009/0100287 A1 | 4/2009 | Chu | |
| 2009/0158020 A1 | 6/2009 | Chen et al. | |
| 2009/0158024 A1 | 6/2009 | Hung | |
| 2009/0172639 A1 | 7/2009 | Natu | |
| 2009/0249113 A1 | 10/2009 | Chou | |
| 2009/0271602 A1 | 10/2009 | Burks, III | |
| 2009/0327684 A1 | 12/2009 | Zimmer | |
| 2010/0017589 A1 | 1/2010 | Reed | |
| 2010/0064127 A1 | 3/2010 | Lee | |
| 2010/0082960 A1 | 4/2010 | Grobman | |
| 2010/0100720 A1 | 4/2010 | Wu | |
| 2010/0235617 A1 | 9/2010 | Chen | |
| 2011/0066837 A1 | 3/2011 | Lee | |
| 2011/0087872 A1* | 4/2011 | Shah | H04L 9/3236 713/2 |
| 2011/0093675 A1* | 4/2011 | Lu | G06F 11/1417 711/162 |
| 2011/0093741 A1* | 4/2011 | Liang | G06F 11/1417 714/6.1 |
| 2012/0011393 A1 | 1/2012 | Roberts | |
| 2012/0072710 A1 | 3/2012 | Gupta | |
| 2012/0072897 A1 | 3/2012 | Selvam | |
| 2012/0239920 A1 | 9/2012 | Yang | |
| 2012/0303944 A1 | 11/2012 | Peng et al. | |
| 2012/0324150 A1 | 12/2012 | Moshayedi et al. | |
| 2013/0159690 A1 | 6/2013 | Tsukamoto | |
| 2013/0232325 A1 | 9/2013 | Jang | |
| 2014/0115314 A1 | 4/2014 | Huang | |
| 2014/0237223 A1 | 8/2014 | Chudgar | |
| 2014/0281455 A1 | 9/2014 | Kochar | |
| 2014/0325203 A1 | 10/2014 | Roche | |
| 2015/0095632 A1 | 4/2015 | Huang | |
| 2015/0242656 A1 | 8/2015 | Dasari | |
| 2015/0301880 A1 | 10/2015 | Allu | |
| 2015/0324588 A1 | 11/2015 | Locke | |
| 2016/0055113 A1 | 2/2016 | Hodge | |
| 2016/0055338 A1* | 2/2016 | Jeansonne | G06F 21/575 713/2 |
| 2016/0063255 A1 | 3/2016 | Jeansonne | |
| 2016/0364570 A1 | 12/2016 | Stern | |
| 2017/0249002 A1 | 8/2017 | Costa | |

OTHER PUBLICATIONS

Jeansonne et al., International Application No. PCT/US13/37724 entitled Recovering From Compromised System Boot Code filed Apr. 23, 2013 (29 pages).

Jeansonne et al., International Application No, PCT/US13/37727 entitled Configuring a System filed Apr. 23, 2013 (35 pages).

Jeansonne et al., International Application No. PCT/US13/37728 entitled Event Data Structure to Store Event Data filed Apr. 23, 2013 (36 pages).

Jeansonne et al., International Application No. PCT/US13/37733 entitled Retrieving System Boot Code From a Non-Volatile Memory filed Apr. 23, 2013 (26 pages).

Jeansonne el al., International Application No. PCT/US13/37735 entitled Verifying Controller Code and System Boot Code filed Apr. 23, 2013 (36 pages).

(56) References Cited

OTHER PUBLICATIONS

Yin, et al; "Verification-based Multi-backup Firmware Architecture, an Assurance of Trusted Boot Process for the Embedded Systems", < : http://ieexplore.ieee.org/document/6120953/.
European Patent Office, Extended European Search Report for Appl. No. 13883286.0 dated Dec. 16, 2016 (16 pages).
U.S. Appl. No, 14/780,892, Non-Final Office Action dated Jun. 16, 2017, pp. 1-23 and attachments.
U.S. Appl. No, 14/780,967, Final Rejection dated Jun. 28, 2017, pp. 1-12 and attachments.
U.S. Appl. No. 14/780,967, Non-Final Office Action dated Oct. 14, 2017 pp. 1-10 and attachments.
U.S. Appl. No. 14/780,989, Non-Final Rejection dated May 10, 2017, pp. 1-8 and attachments.
U.S. Appl. No. 14/780,989, Notice of Allowance dated Sep. 13, 2017, pp. 1-3 and attachments.
U.S. Appl. No. 14/780,892, Final Rejection dated Dec. 21, 2017, pp. 1-17 and attachments.
U.S. Appl, No. 14/780,967, Final Rejection dated Sep. 29, 2017, pp. 1-10 and attachments.
U.S. Appl. No. 14/780,967, Notice of Allowance dated Nov. 17, 2017, pp. 1-4 and attachments.

\* cited by examiner

REPAIRING COMPROMISED SYSTEM DATA IN A NON-VOLATILE MEMORY

BACKGROUND

A computing system can include code to perform various startup functions of the computing system. This code can include Basic Input/Output System (BIOS) code or other code.

BRIEF DESCRIPTION OF THE DRAWINGS

Some implementations are described with respect to the following figures.

DETAILED DESCRIPTION

Various types of system data can be stored in a non-volatile memory of a computing system. The system data is accessed during operation of the computing system to ensure correct operation of the computing system. The system data can be stored in various data structures in the non-volatile memory, and can relate to a configuration of at least one component of the computing system. For example, the system data can relate to a configuration of the computing system, or alternatively, the system data can relate to a configuration of an individual component or multiple components of the computing system.

Examples of computing systems include desktop computers, notebook computers, tablet computers, personal digital assistants (PDAs), smartphones, game appliances, server computers, storage nodes, network communication nodes, and so forth.

The system data in the non-volatile memory may be compromised due to unauthorized access and operations in the computing system, such as by malware. Additionally, the system data in the non-volatile memory may be compromised inadvertently. Once system data is compromised, correct operation of the computing system may not be possible.

Although mechanisms are provided to protect system code stored in the non-volatile memory from being compromised, mechanisms may not exist for protecting system data stored in the non-volatile memory. Examples of system code that can be stored in the non-volatile memory include system firmware, which is used to perform startup or resume operations of a computing system. System firmware is in the form of machine-readable instructions executable on a processor (or processors) of the computing system.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include legacy BIOS code or Unified Extensible Firmware Interface (UEFI) code. In some examples, the BIOS code can include a runtime portion that is executed after the OS loads.

Examples of system data that can be stored in the non-volatile memory include at least some of the following. Although reference is made to specific examples of system data, it is noted that techniques or mechanisms according to some implementations can be applied to other types of system data.

The system data can include machine unique data, which can refer to any configuration data or settings that are unique to each particular computing system. Examples of machine unique data can include any or some combination of the following: product name, product model, stock-keeping unit (SKU) number (for identifying the respective computing system for sale), a serial number of the computing system, a system or commodity tracking number (for identifying a system board of the computing system), a system configuration identifier (for identifying a configuration of the computing system), warranty data (for describing a warranty associated with the computing system), a universally unique identifier (UUID), a default setting of BIOS code, a unique cryptographic identifier (e.g. a cryptographic key) for protecting and binding information to the computing system, and so forth. The foregoing is provided as examples of machine unique data; in other examples, other or additional types of machine unique data can be provided. The machine unique data can be stored in corresponding data structure in the non-volatile memory, such as a machine unique data (MUD) region of the non-volatile memory.

The system data can also include configuration data of a network controller of the computing system. The network controller can be used to communicate over a network according to a network protocol, such as an Ethernet protocol (e.g. Gigabit Ethernet protocol or other type of Ethernet protocol), or another type of protocol. In examples where the network protocol supported by the network controller is the Gigabit Ethernet (GbE) protocol, the configuration data of the network controller can include data in a GbE region of the non-volatile memory. The GbE region is a data structure containing configuration data (e.g. programmable settings) for the network controller that can be part of the computing system. The programmable settings are read by the network controller upon deassertion of a bus reset signal on a bus to which the network controller is connected.

In other examples, the system data can include data in a Descriptor region in the non-volatile memory. The Descriptor region is a data structure containing information that describes a layout of the non-volatile memory that stores system firmware, and configuration parameters for an input/output (I/O) controller, such as the Platform Controller Hub (PCH) from Intel Corporation, or another type of I/O controller. The PCH can include various functions, including a display interface to a graphics subsystem, a system bus interface to a system bus to which various I/O devices can be connected, and so forth. The I/O controller can read the data in the Descriptor region upon exit of the I/O controller from reset.

In accordance with some implementations, to perform verification of the integrity of system data in the non-volatile memory, a redundant copy of the system data can be provided. In some implementations, the system data used by the computing system is stored in a primary non-volatile memory. The redundant copy of the system data is stored in a secondary non-volatile memory. The redundant copy of the system data can be identical to the system data in the primary non-volatile memory, or be of a different version (earlier version or later version) of the system data in the primary non-volatile memory.

Figure 1:
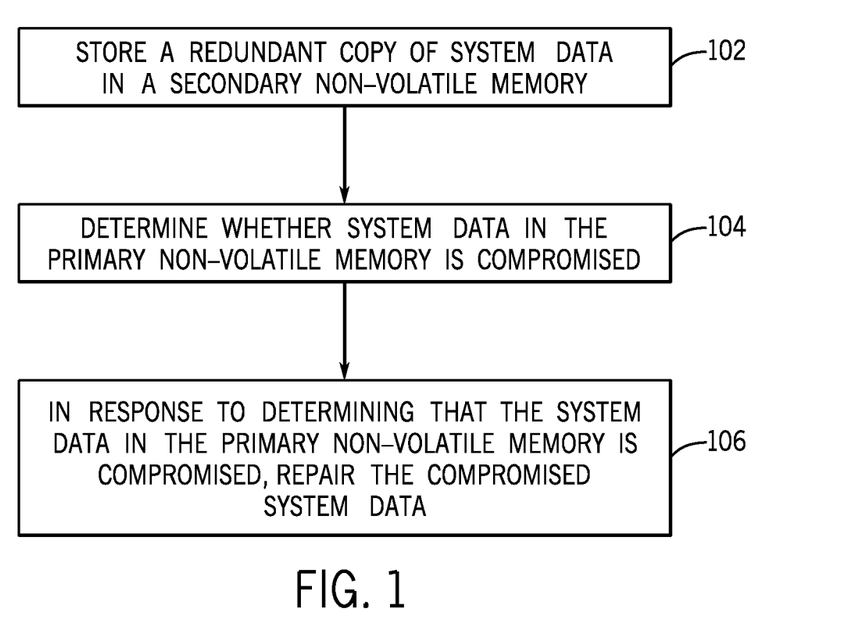
FIG. 1 is a flow diagram of a system data integrity verification process, according to some implementations.

FIG. 1 is a flow diagram of a system data verification process according to some implementations. Some of the tasks of FIG. 1 can be performed by a controller, such as an embedded controller, that is separate from the processor(s) of the computing system that is (are) used to execute the system firmware. The embedded controller can be used to perform certain designated tasks, as discussed further below. Some of the tasks of FIG. 1 can also be performed by system firmware.

The process of FIG. 1 stores (at 102) a redundant copy of system data in the secondary non-volatile memory, where the system data relates to a configuration of at least one physical component of the computing system. For example, the system data can include the machine unique data, configuration data of a network controller, and Descriptor region data. The secondary non-volatile memory is accessible by the embedded controller, but inaccessible to the processor(s) in the computing system. The process can also store check value(s) in the secondary non-volatile memory, where the check value(s) can be a hash value, checksum, or other value computed based on the content of respective piece(s) of the system data.

The process of FIG. 1 determines (at 104) whether system data in the primary non-volatile memory that is accessible to the processor(s) is compromised, based on either the redundant copy of the system data or based on the check value(s) in the secondary non-volatile memory In response to determining that the system data in the primary non-volatile memory is compromised, the embedded controller and/or system firmware can repair (at 106) the compromised system data in the primary non-volatile memory by using the redundant copy of system data in the secondary non-volatile memory.

Figure 2:
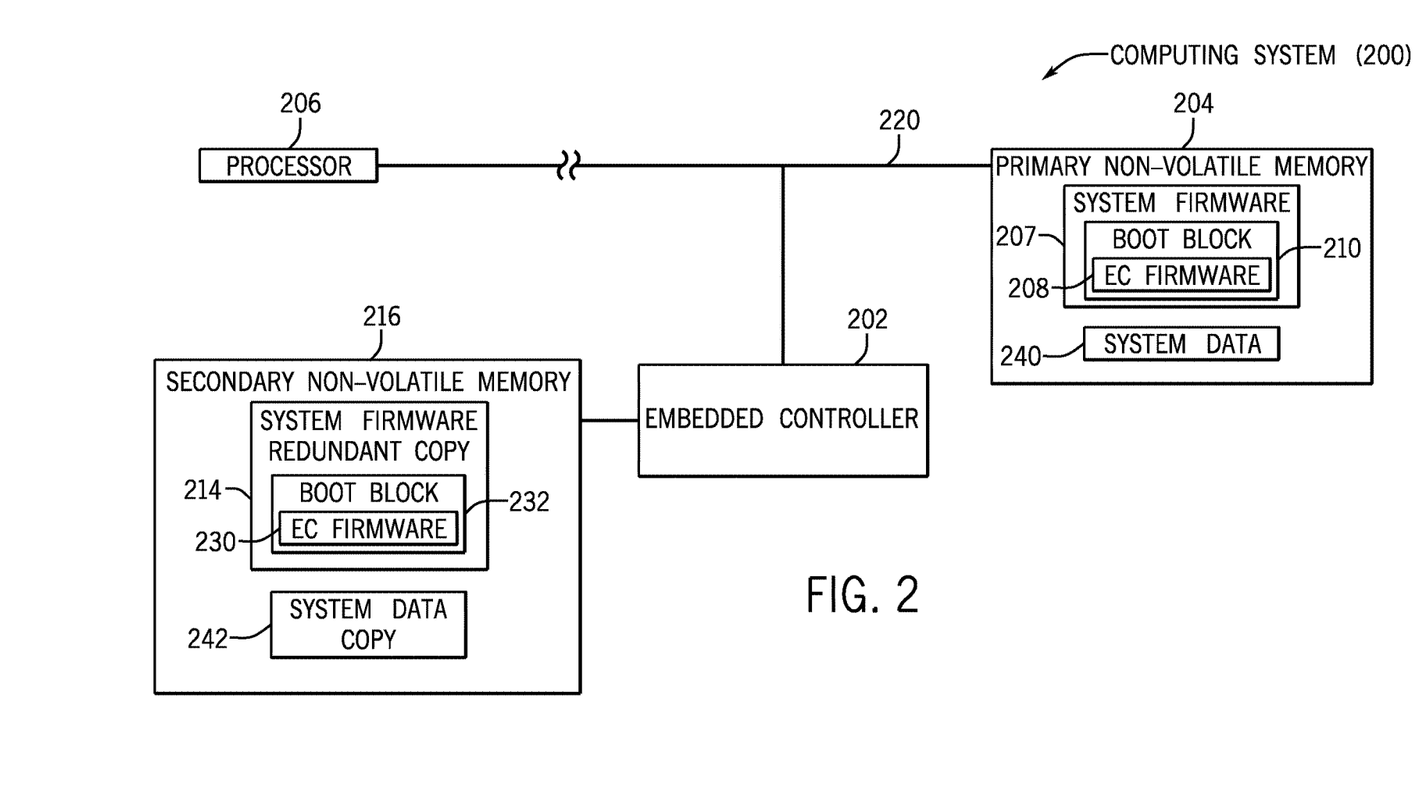
FIGS. 2 and 3 are block diagrams example computing systems that incorporate some implementations.

FIG. 2 is a block diagram of an example computing system 200 that includes an embedded controller 202, a primary non-volatile memory 204, a processor 206, and a secondary non-volatile memory 216. The primary non-volatile memory 204 is a shared non-volatile memory that it is accessible by multiple entities, including the embedded controller 202 and at least one other entity (including the processor 206). The secondary non-volatile memory 216 is accessible by the embedded controller 202, but is inaccessible to the processor 206 or to other components in the computing system 200 (effectively, the secondary non-volatile memory 216 is electrically isolated from entities other than the embedded controller 202). Making the secondary non-volatile memory 216 inaccessible to the processor 206 and other components protects the content of the secondary non-volatile memory 216 from unauthorized tampering. The secondary non-volatile memory 216 can be accessible by the embedded controller 202 at all times.

Although not shown in FIG. 2, an input/output (I/O) controller may be provided between the processor 206 and the primary non-volatile memory 204.

The secondary non-volatile memory 216 can be physically separate from the primary non-volatile memory 204 (such as implemented in different physical memory devices). Alternatively, the secondary non-volatile memory 216 and the primary non-volatile memory 204 can physically reside on a common memory device, but the primary non-volatile memory 204 and the secondary non-volatile memory 216 are in different segments of the physical memory device, where the segment of the physical memory device that contains the secondary non-volatile memory 216 is accessible by only the embedded controller 202. In other words, the segment that contains the secondary non-volatile memory 216 is under exclusive control of the embedded controller 202, and this segment is locked from access by the processor 206 or another entity.

The primary non-volatile memory 204 is accessible over a shared bus 220 by the embedded controller 202 or by another entity. Note that the secondary non-volatile memory 216 is electrically isolated from the shared bus 220. In some implementations, just one entity can have access to the shared bus 220 at any given time, such that just one entity can access the primary non-volatile memory 204 at a time. In some examples, the shared bus 220 is a shared Serial Peripheral Interface (SPI) bus. An SPI bus is a synchronous serial data link in which devices on the SPI bus operate in a master-slave mode. In other examples, another type of shared bus 220 can be used. In alternative examples, an arbitration mechanism can be provided to allow for shared access of the bus 220 in various states of the computing system, including a low power state and a normal runtime state.

The primary non-volatile memory 204 can store system firmware 207, which can include BIOS code. The system firmware 207 can include EC firmware 208 that is for execution by the embedded controller 202, and a boot block 210 that is to be executed by the processor 206. Although reference is made to "EC firmware," it is noted that techniques or mechanisms can be applied to other forms of the controller code that can be executed by the embedded controller 202. The embedded controller code includes machine-readable instructions executable on the embedded controller.

In examples according to FIG. 2, the EC firmware 208 is included in the boot block 210 of the system firmware 207. Including the EC firmware 208 inside the boot block 210 can provide an indication that the EC firmware 208 has been signed by the entity that provided the system firmware 207, which can be the vendor of the computing system 200, or another entity. In other examples, the EC firmware 208 can be separate from the boot block 210.

The boot block 210 is a part of the BIOS code, and is first executed when the computing system 200 starts up. The boot block 210 is executed first before the rest of the BIOS code is allowed to execute on the processor 206. The boot block 210 can be used to check the integrity of the BIOS code as well as to perform other initial functions. If the boot block 210 confirms the integrity of the BIOS code, then the boot block 210 can pass control to the main portion of the BIOS code for initiating the remaining operations associated with the BIOS code.

In some implementations, the boot block 210 can include core root of trust for measurement (CRTM) logic, which is logic specified by the Trusted Computing Group (TCG), an industry standard work group. During a power on procedure of the computing system 200, the CRTM logic can perform certain initialization tasks and can make a number of measurements that are stored for later use. The CRTM logic can then check the BIOS code before passing control to the main portion of the BIOS code. Once the BIOS code completes execution and passes control to the OS, the OS can verify the trustworthiness of the computing system 200 based on measurements taken by the CRTM logic.

The embedded controller 202 is physically separate from the processor 206 of the computing system 200. The processor 206 is used for executing the OS, application code, and other code in the system 200. The embedded controller 202, on the other hand, can be used to perform specific predefined tasks, as programmed into the EC firmware 208.

Examples of tasks that can be performed by the embedded controller 202 include any one or some combination of the following: power supply control in the computing system 200 (for controlling a power supply that supplies power supply voltages to various components in the computing system 200), charging and control of a battery in the computing system 200, thermal monitoring to monitor a temperature in the computing system 200), fan control (to control a fan in the computing system 200), and interaction with a user input device (such as performing a scan of a keyboard of the computing system 200 or interaction with a pointing device such as a mouse, touchpad, touchscreen, and so forth). The embedded controller 202 can be implemented with a microcontroller, an application-specific integrated circuit (ASIC), a programmable gate array (PGA), or any other type of programmable circuit.

The secondary non-volatile memory 216 stores a redundant copy 214 of system firmware, where the system firmware redundant copy 214 includes a boot block 232 and an EC firmware 230. The system firmware redundant copy 214 in the secondary non-volatile memory 216 can be a duplicate of the system firmware 207 in the primary non-volatile memory 204. Alternatively, the system firmware redundant copy 214 may be a different version (later version or earlier version) than the system firmware 207.

In some implementations, the system firmware redundant copy 214 includes just the boot block 232, but does not include the main portion of the system firmware 207. In other implementations, the system firmware redundant copy 214 can include the entirety of the system firmware 207.

The primary non-volatile memory 204 also stores system data 240, such as the system data discussed further above. The system data 240 is accessible by the computing system 200 during system operation.

The embedded controller 202 can be instructed, such as by the system firmware 207 executing on the processor 206, to copy the system data 240 in the primary non-volatile memory 204 to the secondary non-volatile memory 216. Such copying creates the system data copy 242 in the secondary non-volatile memory 216. The instruction to perform the copying of the system data 240 from the primary non-volatile memory 204 to the secondary non-volatile memory 216 can be performed in a secure environment, such as during the manufacturing process of the computing system at a factory. Alternatively, the copying of the system data 240 from the primary non-volatile memory 204 to the secondary non-volatile memory 216 can be performed in another context, such as at a product service facility that is used to service products.

In some examples, upon saving the system data copy 242 to the secondary non-volatile memory 216, the embedded controller 202 can calculate hash, checksum, or other value (generally referred to as a "check value") based on the content of the system data. This check value can be saved to the secondary non-volatile memory 216 and associated with the system data copy 242.

Note that a separate check value can be calculated for each type of system data 240 (e.g. machine unique data, GbE region data, Descriptor region data, etc.) copied to the secondary non-volatile memory 216. The check values associated with the various types of system data in the secondary non-volatile memory 216 can be used later to verify the integrity of the content of each respective type of system data in the primary non-volatile memory 204, to ensure that the content has not been compromised due to malware, a code bug, or other cause.

The check value associated with the machine unique data copy stored in the secondary non-volatile memory 216 can be used by the system firmware 207 executing on the processor 206 to verify the integrity of the machine unique data in the primary non-volatile memory 204. The system firmware 207 can calculate the check value based on the machine unique data in the primary non-volatile memory 204, and can compare the calculated check value with the check value stored in the non-volatile memory 216. If the check values match, then the system firmware 207 determines that the machine unique data in the primary non-volatile memory 204 is valid. On the other hand, if the check values do not match, then the system firmware 207 determines that the machine unique data has been compromise.

If the machine unique data in the primary non-volatile memory 204 is determined to be compromised, then the copy of the machine unique data in the secondary non-volatile memory 216 can be used to repair the compromised machine unique data, by replacing the compromised machine unique data with the copy of the machine unique data from the secondary non-volatile memory 216.

The verification of the GbE region data or Descriptor region data in the primary non-volatile memory 204 may be performed by the embedded controller 202, instead of by the system firmware 207. Similar with verifying the integrity of the machine unique data, the embedded controller 202 can compare a calculated check value to a stored check value in the secondary non-volatile memory 216 to determine whether or not the GbE region data or Descriptor region data has been compromised.

In other implementations, instead of using the check values stored in the secondary non-volatile memory 216, each specific piece of the system data 240 in the primary non-volatile memory 204 can be verified by comparing the respective piece of system data copy 242 in the secondary non-volatile memory 216. For example, the machine unique data, GbE region data, or Descriptor region data in the primary non-volatile memory 204 can be compared to the respective copy of the machine unique data, GbE region data, or Descriptor region data, to determine whether the respective piece of data has changed, which indicates that the respective piece of data has been compromised.

In further implementations, the system firmware 207 and/or embedded controller 202 is able to monitor writes to the system data 240 in the primary non-volatile memory 204. The system firmware 207 and/or embedded controller 202 can be notified of any such writes, such that the system firmware 207 and/or embedded controller 202 can perform the verification of the written system data 240 to protect against unauthorized updating of the system data 240.

As noted above, the system data copy 242 can be captured in the secondary non-volatile memory 216 in a secure environment, such as at a factory or repair facility. The system data copy 242 stored in the secondary non-volatile memory 216 can be treated as read-only to protect the system data copy 242 from compromise.

In alternative implementations, signatures can be associated with the system data 240 stored in the primary non-volatile memory 204. Such signatures can include digital signatures produced using asymmetric or symmetric cryptography. Alternatively, the signatures can be hash values computed based on the content of the system data 240. For example, a signature can be associated with each of the machine unique data, GbE region data, and Descriptor region data stored in the primary non-volatile memory 204. A signature can be based on an encryption of a hash, check, or other value computed based on the content of the respective piece of system data 240. The encryption can be performed using an encryption key (e.g. public key or private key). To verify the integrity of the respective piece of system data 240 and its source, the signature can be decrypted using an encryption key (e.g. private key or public key). The decrypted value can then be compared to a hash value to verify the integrity of the piece of the system data 240 and its source.

Associating signatures with each of the different pieces of system data 240 allows for a secure update mechanism outside of a factory or service environment. For example, in the event that an update of the machine unique data, GbE region data, or Descriptor region data in the primary non-volatile memory 204 is to be performed, the respective signature can be used to ensure that the update data is from a trusted source.

Also, the embedded controller 202 can authenticate the machine unique data, GbE region data, or Descriptor region data in the primary non-volatile memory 204, to use for updating the respective piece of the system data copy 242 in the secondary non-volatile memory 216, in the event that the corresponding piece of the system data copy 242 becomes compromised.

By also storing signatures with each piece of the system data copy 242 in the secondary non-volatile memory 216, the system data copy 242 can be protected from tampering, such as by malware or even by a physical attack in which the secondary non-volatile memory 216 is removed and reprogrammed with different content.

Figure 3:
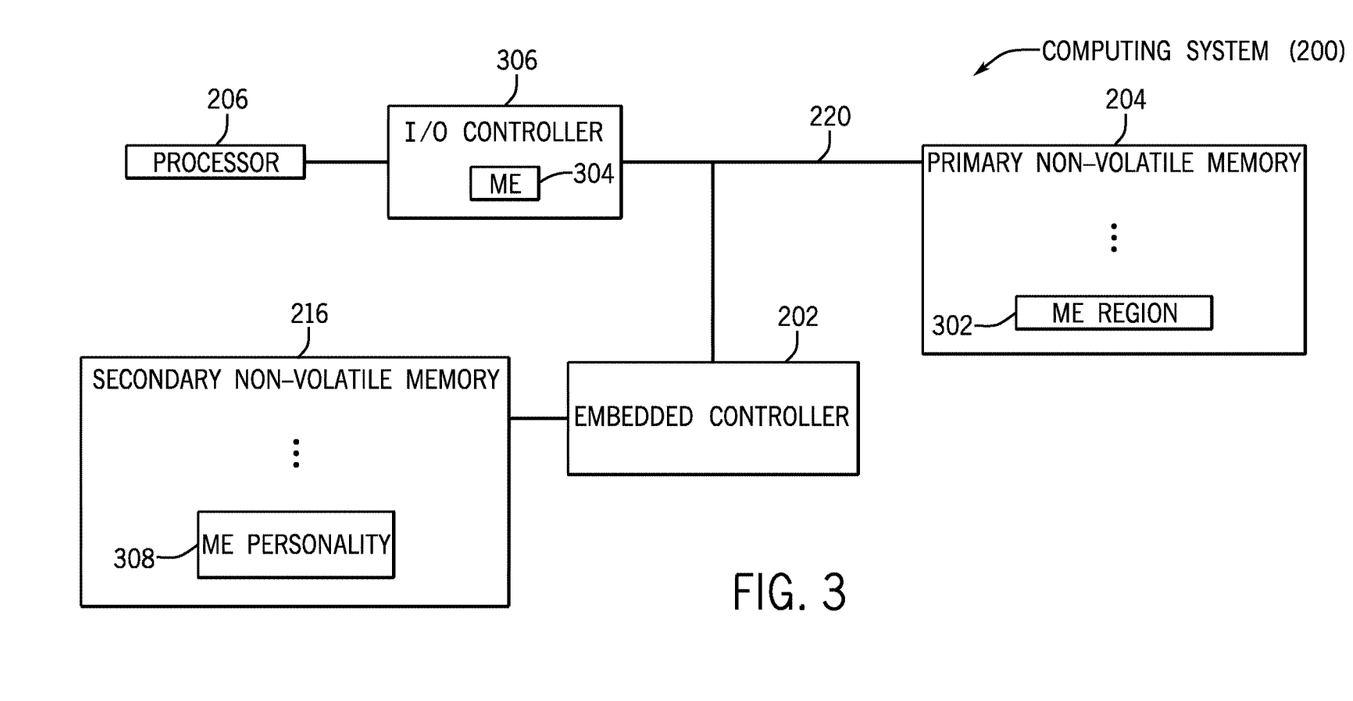

In further implementations, as further shown in FIG. 3, the primary non-volatile memory 204 can further store a Management Engine (ME) region 302, which is another data structure in the primary non-volatile memory 204. The ME region 302 includes code (e.g. firmware or other machine-readable instructions) of an ME 304, which is part of a chipset from Intel Corporation. The ME region 302 can also include data associated with the ME code. For example, the ME 304 can be included in an I/O controller 306 connected to the shared bus 220. The I/O controller 306 can include a PCH or another type of I/O controller. The ME 304 provides functionalities to allow for monitoring, maintenance, updating, upgrading, and repairing of a computing system, for example. Another example of such an entity includes a Platform Security Processor (PSP) from Advanced Micro Devices (AMD), Inc.

Traditionally, the ME region data 302 is not recoverable in the field in the event of a compromise. In accordance with some implementations, the ME 304 can monitor the content of the ME region 302. For example, a hash, check, or other value can be computed based on the content of the ME region 302, and compared to a pre-stored hash, check, or other value.

The secondary non-volatile memory 216 can store ME personality information 308, The ME personality information 308 provides an indication of which feature(s) of the ME 304 has (have) been enabled or disabled. The feature(s) of the ME 304 may have been enabled/disabled at the factory or at another site. The ME personality information 308 is based on the enabling/disabling of the feature(s) of the ME 304 set at the factory or at another site.

Figure 4:
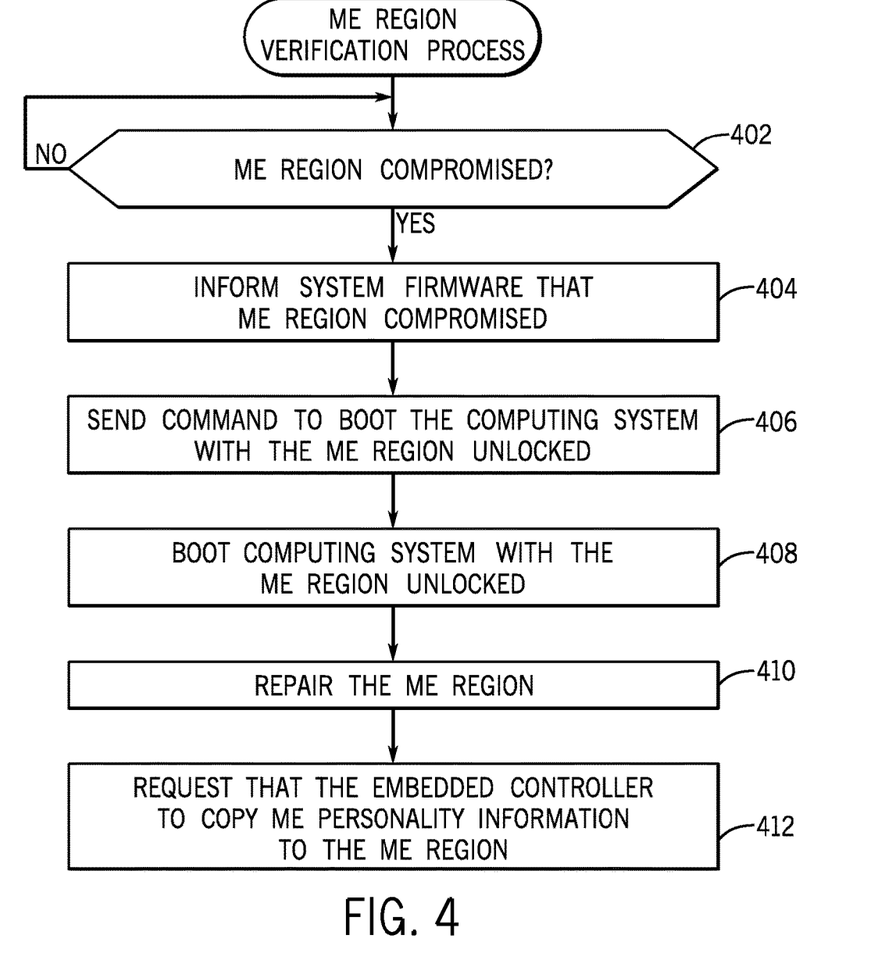
FIG. 4 is a flow diagram of a management engine region verification process, according to some implementations.

FIG. 4 shows a verification process relating to the ME region 302. If it is detected (at 402) that the ME region 302 is compromised, the ME 304 (or embedded controller 202) can inform (at 404) the system firmware 207 (executing on the processor 206) that the ME region 302 is compromised. In response, the system firmware 207 can send (at 406) a command to boot the computing system 200 with the ME region 302 unlocked. The Descriptor region in the primary non-volatile memory 204 can include access restrictions that specify that the ME region 302 is to be blocked from access by any machine-readable instructions executing on the processor 206. The command to boot the computing system 200 with the ME region 302 unlocked informs the I/O controller 306 to disregard the read/write restrictions in the Descriptor region pertaining to the ME region 302.

The computing system 200 is booted (at 408) with the ME region 302 unlocked. During the boot procedure, the system firmware 207 can repair (at 410) the ME region 302, by copying a recovery image from an external storage device or from the secondary non-volatile memory 216 to the primary non-volatile memory 204.

In addition, the system firmware 207 can request (at 412) that the embedded controller 202 copy ME personality information 308 stored in the secondary non-volatile memory 216 to the ME region 302 of the primary non-volatile memory 204. The ME personality information 308 provides an indication of which feature(s) of the ME 304 has (have) been enabled or disabled. The feature(s) of the ME 304 may have been enabled/disabled at the factory or at another site. Copying the ME personality information 308 to the ME region 302 in the primary non-volatile memory 204 causes the appropriate feature(s) of the ME 304 to be enabled or disabled.

In the foregoing process of FIG. 4, instead of performing various tasks using the system firmware 207, the embedded controller 202 can be used instead.

Machine-readable instructions of various modules, described above are loaded for execution on a processing circuit (e.g. embedded controller 102 or processor 106). A processing circuit can include a microprocessor, microcontroller, processor module or subsystem programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks: other magnetic media including tape: optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
storing, in a first non-volatile memory, a redundant copy of system data that relates to a configuration of at least one physical component of a system, wherein the first non-volatile memory is accessible by a controller in the system and inaccessible to a processor in the system, wherein an operating system of the system is executable on the processor;
determining whether system data in a second non-volatile memory accessible by the processor is compromised, wherein the system data in the second non-volatile memory includes data describing a layout of the second non-volatile memory; and
in response to determining that the system data in the second non-volatile memory is compromised, repairing the compromised system data including the data describing the layout of the second non-volatile memory.

2. The method of claim 1, wherein the system data in the second non-volatile memory further includes machine unique data.

3. The method of claim 1, wherein the system data in the second non-volatile memory further includes data relating to a configuration of a network controller.

4. The method of claim 1, further comprising:
storing, in the first non-volatile memory, personality information relating to a management entity; and
using the personality information to recover from an error of machine-readable instructions of the management entity.

5. The method of claim 4, further comprising:
recovering the machine-readable instructions of the management entity using code from an external storage device or from the first non-volatile memory.

6. The method of claim 1, further comprising:
storing a signature associated with the system data in the second non-volatile memory.

7. The method of claim 6, further comprising updating the redundant copy of system data using the system data in the second non-volatile memory, in response to verification of the system data in the second non-volatile memory using the signature.

8. The method of claim 6, further comprising performing a secure update of the system data in the second non-volatile memory.

9. The method of claim 1, wherein the processor is a hardware processor.

10. A system comprising:
a processor;
an operating system executable on the processor;
an embedded controller;
a first non-volatile memory storing a redundant copy of system data relating to a configuration of at least one physical component in the system, wherein the first non-volatile memory is accessible by the embedded controller and inaccessible by the processor; and
a second non-volatile memory storing the system data including data describing a layout of the second non-volatile memory, wherein the second non-volatile memory is accessible by the embedded controller and the processor,
wherein the embedded controller is to detect compromise of a first portion of the system data in the second non-volatile memory using information stored in the first non-volatile memory, and to repair the compromised first portion of the system data including the data describing the layout of the second non-volatile memory.

11. The system of claim 10, further comprising system boot code, wherein the system boot code is executable on the processor to detect compromise of a second portion of the system data in the second non-volatile memory using information stored in the first non-volatile memory, and to repair the compromised second portion of the system data in the second non-volatile memory.

12. The system of claim 10, wherein the information used by the embedded controller to detect compromise of the first portion of the system data includes a check value computed based on content of the first portion of the system data.

13. The system of claim 10, wherein the information used by the embedded controller to detect compromise of the first portion of the system data includes the redundant copy of the system data.

14. The system of claim 10, wherein the processor is a hardware processor.

15. An article comprising at least one non-transitory machine-readable storage medium storing instructions that upon execution cause a system to:
store, in a first non-volatile memory, a redundant copy of system data that relates to a configuration of at least one physical component of a system, wherein the first non-volatile memory is accessible by a controller in the system and inaccessible to a processor in the system, wherein an operating system of the system is executable on the processor;
determine, by the controller, whether a first portion of system data in a second non-volatile memory accessible by the processor is compromised, based on information stored in the first non-volatile memory, wherein the system data in the second non-volatile memory includes data describing a layout of the second non-volatile memory; and
in response to determining that the first portion of the system data in the second non-volatile memory is compromised, repair, by the controller, the compromised first portion of the system data including the data describing the layout of the second non-volatile memory.

16. The article of claim 15, wherein the repairing comprises repairing the compromised first portion of the system data by replacing the compromised first portion of the system data in the second non-volatile memory with the redundant copy of the first portion of the system data from the first non-volatile memory.

17. The article of claim 15, wherein the processor is a hardware processor.

* * * * *

UNITED STATES PATENT AND TRADEMARK OFFICE
CERTIFICATE OF CORRECTION

PATENT NO. : 9,990,255 B2
APPLICATION NO. : 14/780981
DATED : June 5, 2018
INVENTOR(S) : Jeffrey Kevin Jeansonne et al.

Page 1 of 1

It is certified that error appears in the above-identified patent and that said Letters Patent is hereby corrected as shown below:

On the Title Page

Page 2, Column 2, item [56], Line 16, delete "2008/0289954" and insert -- 2008/0269954 --, therefor.

Signed and Sealed this
Thirteenth Day of November, 2018

Andrei Iancu
*Director of the United States Patent and Trademark Office*